United States Patent
Salter et al.

(10) Patent No.: US 12,233,794 B2
(45) Date of Patent: Feb. 25, 2025

(54) AUTOMOTIVE POWER SUPPLY, UPFITTER MODULE ARCHITECTURES, AND USER DEFINED LOAD SHEDDING RELATED TO SAME

(71) Applicant: FORD GLOBAL TECHNOLOGIES, LLC, Dearborn, MI (US)

(72) Inventors: Stuart C. Salter, White Lake, MI (US); Anthony Gerald King, Ann Arbor, MI (US); Kevin Thomas Hille, Plymouth, MI (US); David Celinske, Wolverine Lake, MI (US); John Anthony DeMarco, Lake Orion, MI (US); Todd Ansbacher, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 18/180,913

(22) Filed: Mar. 9, 2023

(65) Prior Publication Data
US 2024/0300429 A1 Sep. 12, 2024

(51) Int. Cl.
*B60R 16/03* (2006.01)
*G07C 5/08* (2006.01)
*H02J 9/00* (2006.01)

(52) U.S. Cl.
CPC ............ *B60R 16/03* (2013.01); *G07C 5/0816* (2013.01); *H02J 9/002* (2013.01)

(58) Field of Classification Search
CPC ......... B60R 16/03; G07C 5/0816; H02J 9/002
See application file for complete search history.

(56) References Cited

U.S. PATENT DOCUMENTS

| | | | |
|---|---|---|---|
| 8,103,414 B2 | 1/2012 | Boss et al. | |
| 2010/0085179 A1* | 4/2010 | Shank | B60Q 11/00 340/458 |
| 2017/0197565 A1* | 7/2017 | Yoneyama | B60R 16/0238 |
| 2019/0061535 A1 | 2/2019 | Bridges et al. | |
| 2021/0316617 A1 | 10/2021 | Pugh | |
| 2022/0111716 A1 | 4/2022 | McKibben et al. | |
| 2022/0131398 A1 | 4/2022 | Herranz et al. | |

FOREIGN PATENT DOCUMENTS

| | | |
|---|---|---|
| CN | 115042642 A | 9/2022 |
| WO | 2018065043 A1 | 4/2018 |

* cited by examiner

*Primary Examiner* — Lincoln D Donovan
*Assistant Examiner* — Alex W Lam
(74) *Attorney, Agent, or Firm* — Frank Lollo; Brooks Kushman P.C.

(57) ABSTRACT

Responsive to a magnitude of current associated with power from a vehicle being supplied to upfitter loads approaching a predefined threshold, a controller discontinues supply of power to vehicle loads according to a user defined priority order of the vehicle loads such that the vehicle loads of lowest priority among the priority order of the vehicle loads are sequentially shed to maintain the magnitude less than the predefined threshold.

20 Claims, 2 Drawing Sheets

AUTOMOTIVE POWER SUPPLY, UPFITTER MODULE ARCHITECTURES, AND USER DEFINED LOAD SHEDDING RELATED TO SAME

TECHNICAL FIELD

This disclosure relates to automotive power systems.

BACKGROUND

An automotive vehicle may include an energy storage device, such as a battery. This energy may be made available to electrical and electronic components of the vehicle and outside the vehicle. After-market snow plow equipment, for example, may be powered by energy from a battery. Such connections with the battery may be facilitated by a so-called upfitter module.

SUMMARY

A power system of a vehicle includes one or more controllers that receive input of a user defining a priority order of upfitter loads and, responsive to a magnitude of current associated with power from the vehicle being supplied to the upfitter loads approaching a predefined threshold, sequentially discontinue supply of the power to the upfitter loads of lowest priority among the priority order of the upfitter loads such that the magnitude remains less than the predefined threshold.

A method includes, responsive to a magnitude of current associated with power from a vehicle being supplied to upfitter loads approaching a predefined threshold, discontinuing supply of power to vehicle loads according to a user defined priority order of the vehicle loads such that the vehicle loads of lowest priority among the priority order of the vehicle loads are sequentially shed to maintain the magnitude less than the predefined threshold.

A vehicle has a power distribution center including an output, an upfitter module connected to the output, and one or more controllers. The one or more controllers, responsive to a magnitude of current associated with power from the vehicle supplied to upfitter loads that are connected with the power distribution center via the upfitter module approaching a predefined threshold, discontinue supply of the power to the upfitter loads according to a user defined priority order of the upfitter loads such that the upfitter loads of lowest priority among the priority order of the upfitter loads are sequentially shed to prevent the magnitude from exceeding the predefined threshold.

DETAILED DESCRIPTION

Figure 1:
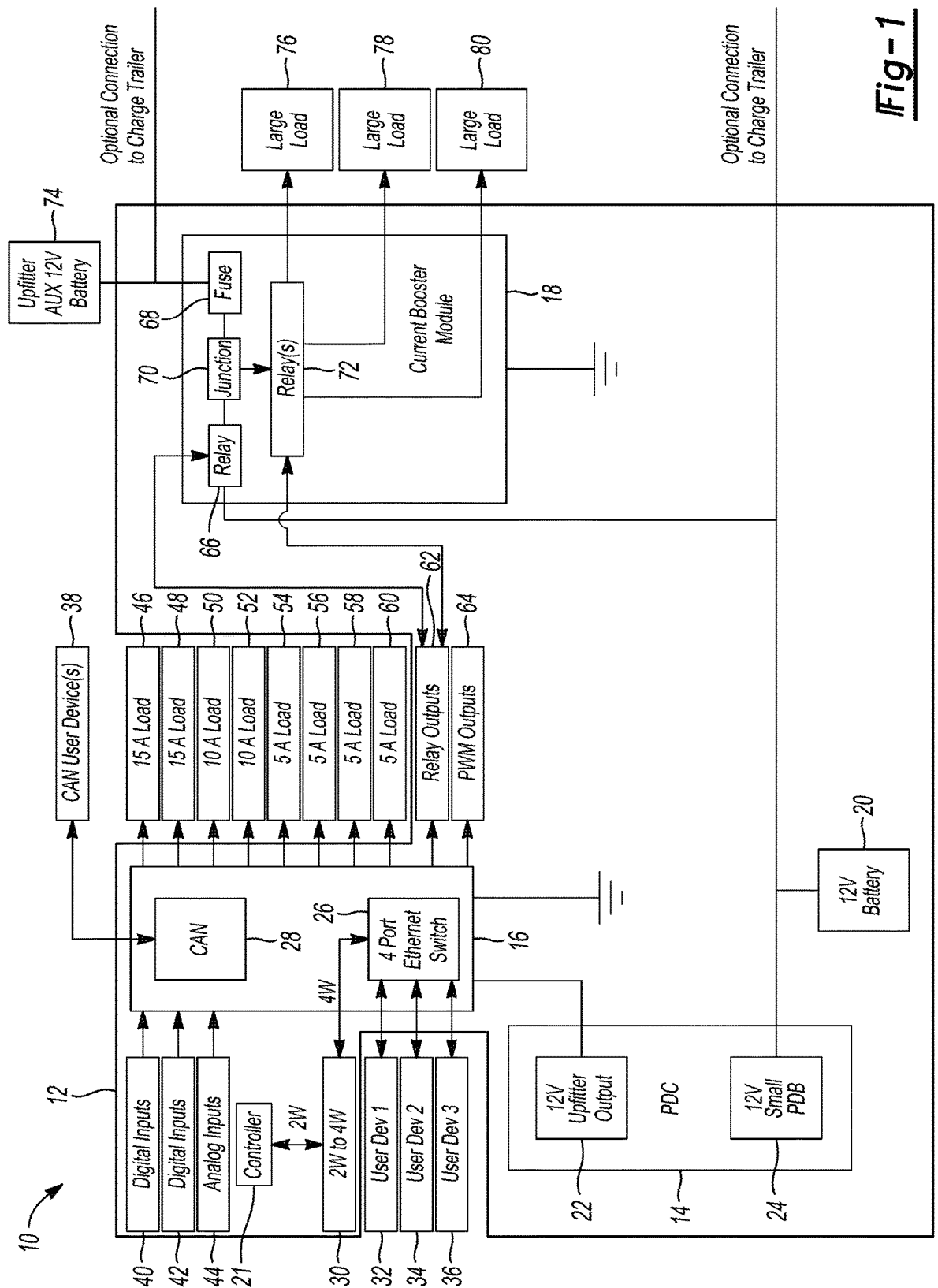
FIGS. 1 and 2 are block diagrams of an automotive power system and upfitter modules.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles typically include a power supply to facilitate functioning of various electrical and electronic components. Several power supply architectures are commonly used in automotive applications, including centralized, decentralized, and hybrid power supply architectures.

Centralized power supply architectures can include a single power supply unit that provides power to all electrical and electronic components in the vehicle. This architecture may be simple and easy to install. In some circumstances however, it may not be suitable for vehicles with high power requirements or those that have different voltage levels for different components.

Decentralized power supply architectures can include multiple power supply units located near the components they power. This architecture may be more flexible than centralized power supply architectures as it permits different voltage levels to be provided to different components. It can also be efficient by reducing the power loss that occurs when power is transmitted over relatively long distances. Decentralized power supply architectures, however, can be more complex with the potential increase in number of connections between power supply units and corresponding components.

Hybrid power supply architectures can be a combination of centralized and decentralized power supply architectures: A central power supply unit provides power to some electrical and electronic components, while other components are powered by decentralized power supply units. This architecture, in certain applications, may provide a balance between flexibility and efficiency.

The use of upfitter modules can affect the power supply systems of automotive vehicles. Upfitter modules, in some examples, are modular components that can be added to a vehicle to provide additional functionality, such as lighting, power distribution, or electrical power management. An upfitter module that provides lighting and power distribution, for example, can be installed in a vehicle, allowing it to be used as a work vehicle, such as a service truck or construction vehicle. Additionally, upfitter modules can be designed to meet specific requirements, such as providing power to a specific component or group of components.

Several factors can be considered when selecting an upfitter module, including the power requirements of the component or group of components that the upfitter module will power, the voltage level required, and the environmental conditions in which the upfitter module will be used.

Some upfitter modules may not support medium or high current applications, may not be expandable, may not provide feedback to the vehicle to manage effects of high current loads, and/or do not support added video cameras, etc.

Certain upfitter modules have taken the form of switches mounted in an over-head compartment and relays in an add-on engine compartment power distribution box. In some arrangements, wires are fed to the engine compartment power distribution box, but not connected to relays. Screens may be used to support touch drive of field effect transistors that control loads.

Here, architectures that provide upfitters opportunity to enable both low power and high power loads that are controlled by the vehicle with feedback are contemplated. In some examples, a base upfitter module is tied to the vehicle via Ethernet and acts as a gateway connecting down-stream expansion modules. A plurality of additional upfitter modules can be connected to the first. Each expansion module recognizes that it is either a master or not, and is daisy chained to a preceding module. This allows the number of modules to be expanded. Each of these modules may thus be plug-and-play, sending signals back to the controller reporting their capabilities. All expansion modules may receive their power from a 100 A output (or other rated output) of a power distribution center for example. As current usage approaches (e.g., comes within 10% or 5% of) the 100 A limit, an operator is notified: The base module reports on loads to the controller.

The arrangement permits automatic load shedding of other vehicle loads and/or upfitter loads, and is programmable by a user, can run off power from an auxiliary charger trailer with a DC/DC converter, and allows key-off operation. Moreover, high current is tied with the batteries to keep transients off of the expansion module power and permits the batteries to act as transient suppression agents for the high current module.

Referring to FIG. 1, an example automotive power system 10 for a vehicle 12 includes a power distribution center 14, an upfitter module 16, an upfitter current booster module 18, a 12V battery 20, and a controller 21.

The power distribution center 14 includes a 12V upfitter output 22 (e.g., a 100 A field effect transistor controlled output) and a 12V interconnector power distribution box 24 (e.g., a 200 A field effect transistor controlled output). The respective ratings of these field effect transistors thus define what their limits are for current flow therethrough. The 12V upfitter output 22 is connected with the upfitter module 16. The interconnector power distribution box 24 is connected with the 12V battery 20.

The upfitter module 16 is grounded and includes a four-port Ethernet switch 26 and a controller area network communications module 28. The four-port Ethernet switch 26 is connected with a two-way to four-way communication module 30, and a plurality of user devices 32, 34, 36. The controller area network communication module 28 is connected with a controller area network user device 38. The upfitter module 16 is configured to receive digital inputs 40, 42 and an analog input 44, to provide current to 15 A loads 46, 48, 10 A loads 50, 52, and 5 A loads 54, 56, 58, 60 in this example. The upfitter module 16 is further configured to provide current to relay outputs 62 and pulse width modulation outputs 64. Multiple such upfitter modules can be so connected (e.g., daisy chained) to obtain as many inputs/outputs as necessary as mentioned above.

The upfitter current booster module 18 is grounded and includes a relay 66, a fuse 68, a junction 70, and a plurality of relays 72. The junction 70 is connected between the relay 66, fuse 68, and relays 72. The relay 66 is connected with the interconnector power distribution box 24. The fuse 68 is connected with an auxiliary 12V battery 74. The relays 72 are configured to provide current to a plurality of large loads 76, 78, 80.

In the above described high current architecture, the upfitter current booster module 18, which can be stamped track relays controlled by the upfitter module 16, is powered from a power distribution center output different from the upfitter module 16. All the expansion modules receive their power from a 100 A output from the power distribution center 14. As current usage approaches the 100 A limit, the operator can be notified (e.g., by screen or phone-as-a-key) via, for example, alerts generated and forwarded by the controller 21. The upfitter module 16 tracks and reports on loads to the controller 21, via the two-way to four-way communication module 30, which facilitates notification of the operator.

The upfitter module 16 allows/facilitates automatic load shedding (the discontinuing of power being supplied) of vehicle loads and/or upfitter loads (e.g., snow plow equipment, power tools, accessory lighting, etc.) prioritized by the operator to stay within the 100 A limit of the corresponding power distribution center output. If 100 A (or 200 A depending on the output port) is not available (as assessed using standard techniques such a current sensors, etc.) from the power distribution center 14, the controller 21 via the two-way to four-way communication module 30 notifies the upfitter module 16. The upfitter module 16 can then request that vehicle loads be shed (e.g., radio, heating, ventilation, air conditioning, etc.). The controller 21, responsive to such requests, can then generate commands to discontinue power flow to the user defined lowest priority vehicle loads. This allows upfitter features to be prioritized in certain scenarios. The reverse, and other scenarios, are also possible as explained in more detail below.

A user may input via an interface (e.g., phone screen, vehicle screen, buttons, etc.) a desired priority scheme for the shedding of upfitter loads and vehicle loads. The user, for example may prioritize all upfitter loads over vehicle loads such that vehicle loads will be shed in order from lowest priority to highest priority before any upfitter loads are shed. Alternatively, the user may prioritize all vehicle loads over upfitter loads such that upfitter loads will be shed in order from lowest priority to highest priority before any vehicle loads are shed. In other situations, the user may prioritize vehicle loads and upfitter loads in mixed fashion such that some of the vehicle loads have a higher or lower priority than some of the upfitter loads, etc. This information may reside within the upfitter module 16, the controller 21, and/or other controllers/modules. As the current magnitude associated with the power being supplied to the upfitter loads approaches a limit, commands may be generated by the controller 21 to discontinue power supply to upfitter and/or vehicle loads of lowest priority to maintain the magnitude less than the limit. That is, if upfitter load 1 and vehicle load 1 has highest priority, vehicle load 2 has middle priority, and upfitter load 2 has lowest priority, upfitter load 2 would be shed first in an attempt to maintain current magnitude less than the limit of the corresponding output. If shedding upfitter load 2 is not sufficient to maintain the current magnitude less than the limit, vehicle load 2 would then be shed next, etc.

Optional connections to a charge trailer are shown for the 200 A output. Communication with the charge trailer can be, for example, controller area network or Ethernet. This allows the upfitter to exceed the 200 A continuous power distribution center limits.

Figure 2:
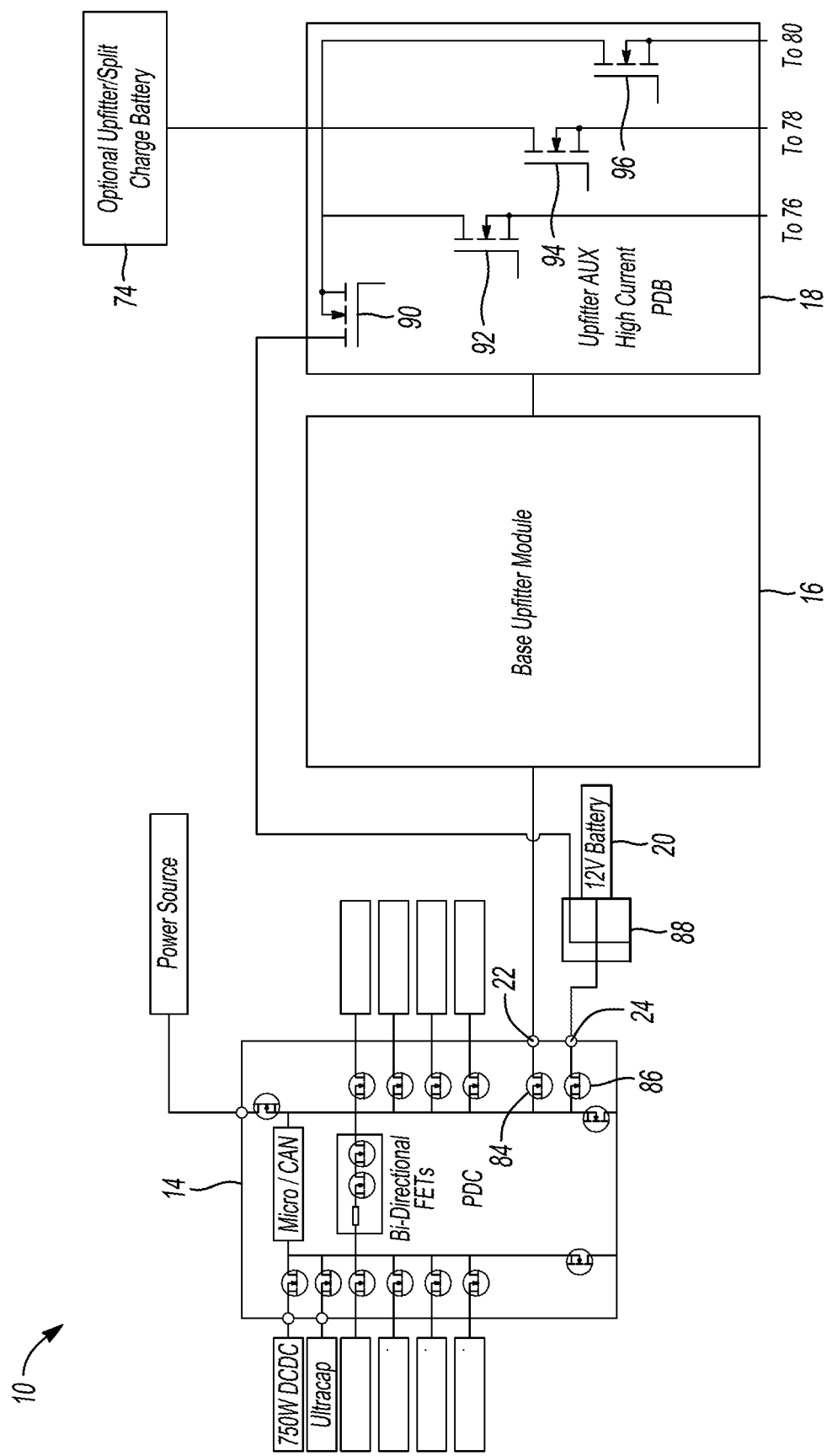

Referring to FIG. 2, the power distribution center 14 further includes a plurality of bidirectional field effect transistors 82, a 100 A capable field effect transistor 84 (continuous), and a 200 A capable field effect transistor 86 (continuous). The 100 A capable field effect transistor 84 is connected between the bidirectional field effect transistors 82 and 12V upfitter output 22. The 200 A capable field effect transistor 86 is connected between the bidirectional field effect transistors 82 and the interconnector power distribution box 24. The power distribution center 14 also includes other field effect transistors connected between the bidirectional field effect transistors 82 and other vehicle components (e.g., a DC/DC converter, an ultra-capacitor, other power sources, etc.).

The automotive power system 10 may further include a power distribution box 88. The power distribution box 88 may be packaged on top of or next to the 12V battery 20. It may serve as an interconnection point for the upfitter current booster module 18, 12V battery 20, interconnector power distribution box 24, and any jump start post.

The upfitter current booster module 18 further includes a plurality of field effect transistors 90, 92, 94, 96. The field effect transistor 90 is connected between the power distribution box 88 and field effect transistors 92, 94, 96. The field effect transistor 92 is connected between the large load 76 and field effect transistor 90. The field effect transistor 94 is connected between the auxiliary 12V battery 74, large load 78, and field effect transistor 90. The field effect transistor 96 is connected between the large load 80 and field effect transistor 90. The field effect transistor 90 is thus arranged to isolate the large load 76, 78, 90 from negative transient loads. These loads may be some of the loads that are assigned priority in the event shedding becomes necessary as described above.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system of a vehicle comprising:
   one or more controllers programmed to receive input of a user defining a priority order of upfitter loads and, responsive to a magnitude of current associated with power from the vehicle being supplied to the upfitter loads approaching a predefined threshold, sequentially discontinue supply of the power to the upfitter loads of lowest priority among the priority order of the upfitter loads such that the magnitude remains less than the predefined threshold.

2. The power system of claim 1, wherein the one or more controllers are further programmed to receive input of the user defining a priority order of vehicle loads and, responsive to the magnitude approaching the predefined threshold, sequentially discontinue supply of power to the vehicle loads of lowest priority among the priority order of the vehicle loads such that the magnitude remains less than the predefined threshold.

3. The power system of claim 2, wherein some of the vehicle loads have a priority order lower than some of the upfitter loads.

4. The power system of claim 1, wherein the one or more controllers are further programmed to generate an alert responsive to the magnitude approaching the predefined threshold.

5. The power system of claim 4, wherein the one or more controllers are further programmed to forward the alert to a display screen or phone.

6. The power system of claim 1 further comprising an upfitter module, wherein the one or more controllers are in communication with the upfitter module.

7. The power system of claim 6 further comprising a power distribution center, wherein the upfitter module is connected to an output of the power distribution center and componentry of the output defines the predefined threshold.

8. The power system of claim 7, wherein the componentry is a field effect transistor.

9. A method comprising:
   responsive to a magnitude of current associated with power from a vehicle being supplied to upfitter loads approaching a predefined threshold, discontinuing supply of power to vehicle loads according to a user defined priority order of the vehicle loads such that the vehicle loads of lowest priority among the priority order of the vehicle loads are sequentially shed to maintain the magnitude less than the predefined threshold.

10. The method of claim 9 further comprising, responsive to the magnitude approaching the predefined threshold, discontinuing supply of the power to the upfitter loads according to a user defined priority order of the upfitter loads such that the upfitter loads of lowest priority among the priority order of the upfitter loads are sequentially shed to maintain the magnitude less than the predefined threshold.

11. The method of claim 10, wherein some of the vehicle loads have a priority order lower than some of the upfitter loads.

12. The method of claim 9 further comprising generating an alert responsive to the magnitude approaching the predefined threshold.

13. The method of claim 12 further comprising forwarding the alert to a display screen or phone.

14. The method of claim 9, wherein the predefined threshold is defined by a rating of a field effect transistor of a power output connected with the upfitter loads.

15. A vehicle comprising:
a power distribution center including an output;
an upfitter module connected to the output; and
one or more controllers programmed to, responsive to a magnitude of current associated with power from the vehicle supplied to upfitter loads, that are connected with the power distribution center via the upfitter module, approaching a predefined threshold, discontinue supply of the power to the upfitter loads according to a user defined priority order of the upfitter loads such that the upfitter loads of lowest priority among the priority order of the upfitter loads are sequentially shed to prevent the magnitude from exceeding the predefined threshold.

16. The vehicle of claim 15, wherein the one or more controllers are further programmed to, responsive to the magnitude approaching the predefined threshold, discontinue supply of power to vehicle loads according to a user defined priority order of the vehicle loads such that the vehicle loads of lowest priority among the priority order of the vehicle loads are sequentially shed to prevent the magnitude from exceeding the predefined threshold.

17. The vehicle of claim 16, wherein some of the vehicle loads have a priority order lower than some of the upfitter loads.

18. The vehicle of claim 15, wherein the one or more controllers are further programmed to generate an alert responsive to the magnitude approaching the predefined threshold.

19. The vehicle of claim 18, wherein the one or more controllers are further programmed to forward the alert to a display screen or phone.

20. The vehicle of claim 15, wherein the power output includes a field effect transistor having a rating that defines the predefined threshold.

* * * * *